United States Patent [19]
Hester, Jr.

[11] 3,714,178
[45] Jan. 30, 1973

[54] 6,7-DIHYDRO-7-ALKYL-5H-1,2,4-TRIAZOLO[4,3-D][1,4]BENZODIAZEPINES AND THEIR PRODUCTION

[75] Inventor: Jackson B. Hester, Jr., Galesburg, Mich.

[73] Assignee: The Upjohn Company, Kalamazoo, Mich.

[22] Filed: Sept. 30, 1971

[21] Appl. No.: 185,379

[52] U.S. Cl. ............... 260/308 R, 71/92, 99/2 G, 99/2 T, 260/239 BD, 260/239.3 D, 260/244 A, 260/558 A, 260/559 A, 424/269
[51] Int. Cl. ............................................. C07d 57/02
[58] Field of Search ........................... 260/308 R

[56] References Cited

FOREIGN PATENTS OR APPLICATIONS 2,012,190    9/1970    Germany ..................... 260/308

*Primary Examiner*—Alton D. Rollins
*Attorney*—Hans L. Berneis et al.

[57] ABSTRACT

6,7-Dihydro-7-alkyl-5H-1,2,4-triazolo[4,3-d][1,4]benzodiazepines of the formula II:

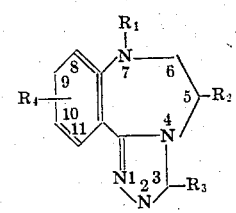

wherein $R_1$ is alkyl of one to three carbon atoms, inclusive; wherein $R_2$ and $R_3$ are selected from the group consisting of hydrogen and alkyl, defined as above; and wherein $R_4$ is selected from the group consisting of hydrogen, alkyl as defined above, nitro, cyano, fluoro, chloro, bromo, iodo, trifluoromethyl, and alkylthio in which alkyl is defined as above, are produced by heating a 5-alkoxy-2,3-dihydro-1-alkyl-1H-1,4-benzodiazepine (I)

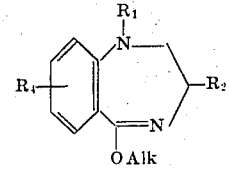

wherein $R_1$, $R_2$, and $R_4$ are defined as above, and Alk is alkyl defined as above, with an alkanoyl hydrazide III

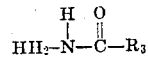

in which $R_3$ is defined as above, usually in an organic solvent.

5 Claims, No Drawings

6,7-DIHYDRO-7-ALKYL-5H-1,2,4-TRIAZOLO[4,3-D][1,4]BENZODIAZEPINES AND THEIR PRODUCTION

The compounds of formula II and the pharmacologically acceptable acid addition salts thereof are useful as tranquilizers in birds and mammals.

BACKGROUND OF THE INVENTION

Field of the Invention

This invention is directed to new organic compounds and is particularly concerned with novel 6,7-dihydro-7-alkyl-5H-1,2,4-triazolo[4,3-d][1,4]benzodiazepines and a process for the production thereof.

The novel compounds and the process of production therefor can be illustratively represented as follows:

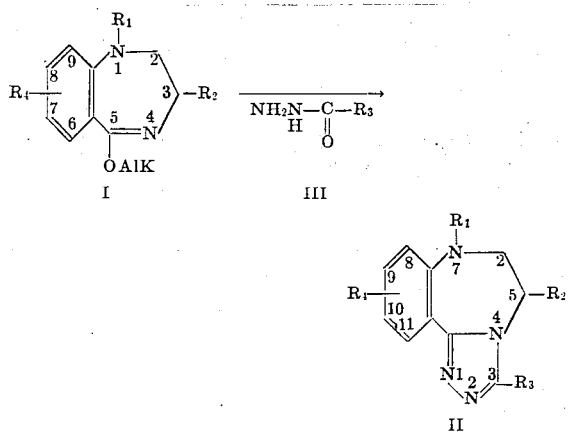

wherein $R_1$ is alkyl of one to three carbon atoms, inclusive; wherein $R_2$ and $R_3$ are selected from the group consisting of hydrogen and alkyl defined as above; and wherein $R_4$ is selected from the group consisting of hydrogen, alkyl as defined above, nitro, cyano, fluoro, chloro, bromo, iodo, trifluoromethyl, and alkylthio in which alkyl is defined as above.

The invention comprises furthermore the pharmacologically acceptable acid addition salts of the compounds of formula II.

The process of this invention comprises: heating a 5-alkoxy-2,3-dihydro-1-alkyl-1H-1,4-benzodiazepine (I), in solution of a lower alkanol of one to four carbon atoms, e.g., methanol, ethanol, 1- and 2-propanol, 1- and 2-butanol or an ether e.g., tetrahydrofuran or dioxan, with an acid hydrazide III to obtain the compound of formula II above.

DESCRIPTION OF THE PREFERRED EMBODIMENT

Lower alkyl groups of one to three carbon atoms, inclusive, are exemplified by methyl, ethyl, propyl, and isopropyl.

The carbon chain moiety of alkylthio, is of one to three carbon atoms, inclusive, and can be defined as lower-alkyl of one to three carbon atoms, inclusive, above.

The novel compounds of the formula II and pharmacologically acceptable addition salts thereof have sedative, hypnotic, anticonvulsant, tranquilizing, and muscle relaxant effects in mammals and birds. Also as feed additives they increase growth rate and feed efficiency of livestock and poultry as well as the egg production of poultry and milk production of cows.

The pharmacologically acceptable acid addition salts of compounds of formula II contemplated in this invention, are the hydrochlorides, hydrobromides, hydroiodides, sulfates, phosphates, cyclohexanesulfamates, methanesulfonates and the like, prepared by reacting a compound of formula II with the selected pharmacologically acceptable acid.

Sedative effects of 10-chloro-6,7-dihydro-3,7-dimethyl-5H-1,2,4-triazolo[4,3-d][1,4]benzodiazepine are shown by the following tests in mice:

Chimney test: [Med. Exp. 4, 145 (1961)]: The effective intraperitoneal dosage for 50 percent of mice ($ED_{50}$) is 5 mg./kg. The test determines the ability of mice to back up and out of a vertical glass cylinder within 30 seconds. At the effective dosage, 50 percent of the mice failed doing it.

Dish test Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50 percent of the mice remain in the dish. The $ED_{50}$ (intraperitoneal administration) in this test was 57 mg./kg.

Pedestal test: The untreated mouse leaves the pedestal in less than a minute to climb back to the floor of the standard mouse box. Tranquilized mice will stay on the pedestal for more than 1 minute. The $ED_{50}$ (intraperitoneal administration) is 89 mg./kg.

Nicotine antagonism test: Mice in a group of six are injected with the test compound (10-chloro-6,7-dihydro-3,7-dimethyl-5H-1,2,4-triazolo[4,3-d][1,4]benzodiazepine). Thirty minutes later the mice including control (untreated) mice are injected with nicotine salicylate (2 mg./kg.). The control mice show overstimulation, i.e., (1) running convulsions followed by (2) tonic extensor fits; followed by (3) death. An intraperitoneal dosage of 89 mg./kg. of the test compound protected 50 percent of the mice against (2) and (3) ($ED_{50}$).

The pharmaceutical forms contemplated by this invention include pharmaceutical compositions suited for oral, parenteral, and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil may be used for preparing solutions or suspensions of the active drug. Sweetening, coloring, and flavoring agents may be added.

For mammals and birds food premixes, with starch, oatmeal, dried fishmeat, fishmeal, flour, and the like can be prepared.

As tranquilizer the compounds of formula II and its pharmacologically acid addition salts thereof can be used in dosages of 1–100 mg./kg. in oral or injectable preparations as described above, to alleviate tension and anxiety in mammals, or birds, such as e.g., occurs when animals are in travel.

To increase weight, feed efficiency, or milk or egg production from 100 g. to 1,000 g. of compound II or acid addition salts are added per ton of feed.

Other acid addition salts of the compounds of formula II can be made such as the fluosilicic acid addition salts which are useful as herbicides against Johnson grass, Bermuda grass, yellow foxtail, and green foxtail, and quack grass.

The starting compounds of this invention are synthetized as shown in the preparations.

In carrying out the process of this invention a selected 2,3-dihydro-5-alkoxy-1-alkyl-1H-1,4-benzodiazepine (I) is reacted with a hydrazide (III),

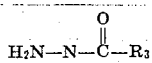

wherein $R_3$ is defined as above. The molar ratio of starting compound I to reactant III can be between 1:1 and 1:2. Larger ratios of I:III are operable, but offer little advantage. In the preferred embodiment of this invention, the starting material I together with reactant III are dissolved in an organic solvent such as an alkanol of one to four carbon atoms, inclusive, e.g., methanol, ethanol 1- and 2-propanol, 1- and 2-butanol, 5-butanol or in an ether e.g., tetrahydrofuran or the like, in a nitrogen atmosphere, and the reaction mixture is refluxed between 2 to 48 hours to give the corresponding 6,7-dihydro-3-substituted or unsubstituted -7-alkyl-5H-1,2,4-triazolo-[4,3-d][1,4]benzodiazepine (II). Compound II is isolated by conventional procedures e.g., extraction, chromatography, crystallization, and the like.

The following Preparations and Examples are illustrative of the products and process of the present invention, but are not to be construed as limiting.

Preparation 1 N-Methyl-4-chloroisatoic anhydride

To a solution of 19.76 g. (0.1 mole) of 4-chloroisatoic anhydride in 100 ml. of dimethylformamide was added portionwise, with stirring, 4.3 g. of a 58.6 percent sodium hydride dispersion in mineral oil (0.105 mole). The mixture was stirred for an hour and then 47.5 g. (0.34 mole) of methyl iodide in 100 ml. of dimethylformamide was added (exothermic). The mixture was refluxed for 5 hours. The dimethylformamide was removed under reduced pressure, water was added and the mixture extracted with chloroform, washed with water, dried and concentrated to a crystalline product. Trituration with ether gave 12.55 g. of N-Methyl-5-chloroisatoic anhydride of melting point 198°–199.5° C.

Anal. calcd. for $C_9H_6ClNO_3$:

C, 51.08; H, 2.86; Cl, 16.76; N, 6.61.

Found:

C, 51.50; H, 2.93; Cl, 16.89; N, 6.22.

Preparation 2 2-Methylamino-5-chlorobenzamide

A solution of 12.55 g. of N-methyl-5-chloroisatoic anhydride in 250 ml. of liquid ammonia was allowed to stand at ambient temperature overnight during which time the ammonia evaporated. The residue was recrystallized from 1,600 ml. of hot water; yield, 8.45 g. of 2-methyl-amino-5-chlorobenzamide of melting point 148°–149° C.

Anal. calcd. for $C_8H_9ClN_2O$:

C, 52.04; H, 4.91; Cl, 19.20; N, 15.18.

Found:

C, 51.53; H, 5.03; Cl, 19.23; N, 14.58.

Preparation 3 2-[N-Methyl-N-(2-hydroxyethyl)]amino-5-chlorobenzamide

To 150 ml. of ethylene oxide in 1,100 ml. of glacial acetic acid in an ice bath was added 70.0 g. of 2-methyl-amino-5-chlorobenzamide. The mixture was stirred at 0°–5° C. for 2 hours and then at room temperature for 48 hours. The solution was concentrated to one-half volume under reduced pressure and neutralized to pH 8.0 with 10 percent aqueous sodium hydroxide with cooling. The solution was extracted with ether, dried and concentrated to give 60.2 g. of oily product. The aqueous solution was then extracted with chloroform and concentrated to give 32.4 g., which crystallized and was recrystallized from benzene to yield 6.0 g. of 2-[N-methyl-N-(2-hydroxyethyl)]amino-5-chlorobenzamide of melting point 78°–79 C.

Anal. calcd. for $C_{10}H_{13}ClN_2O_2$:

C, 52.52; H, 5.73; Cl, 15.51; N, 12.25.

Found:

C, 52.61; H, 5.83; Cl, 15.58; N, 12.15.

For the next step, preparation of the 2-[N-methyl-N-(2-chloroethyl)]-amino-5-chlorobenzamide, the oily product, was used without further purification.

Preparation 4 2-[N-Methyl-N-(2-chloroethyl)]amino-5-chlorobenzamide

To 850 ml. of thionyl chloride at 0° C. was added 82.0 g. of 2-[N-methyl-N-(2-hydroxyethyl)]amino-5-chlorobenzamide and the solution stirred at 0° C. for 6 hours and at room temperature overnight. The thionyl chloride was removed under reduced pressure and the syrup washed with 400 ml. of petroleum ether. The residue was dissolved in 300 ml. of water and the pH slowly adjusted to 7 with 10 percent aqueous sodium hydroxide keeping the solution cool. The solution was extracted with chloroform, dried and concentrated to yield 68 g. of crude material. Crystallization from ethyl acetate-Skellysolve B hexanes gave 29.55 g. of 2-[N-methyl-N-(2-chloroethyl)]amino-5-chlorobenzamide of melting point 111°–112.5° C.

Anal. calcd. for $C_{10}H_{12}Cl_2N_2O$:

C, 48.60; H, 4.90; Cl, 28.69; N, 11.34.

Found:

C, 48.93; H, 5.08; Cl, 27.79; N, 11.27.

A second crop of 12.5 g., melting point 105°–107.5°, which is pure by thin layer chromatography (silica gel, ethyl acetate), was obtained upon concentration of the mother liquors.

Preparation 5 7-chloro-1,2,3,4-tetrahydro-1-methyl-5H-1,4-benzodiazepin-5-one

To a suspension of 585 mg. of a 58.6 percent sodium hydride dispersion in mineral oil (14.2 millimoles) in 15 ml. of anhydrous benzene was added dropwise with stirring 2.47 g. (10 millimoles) of 2-[N-methyl-N-(2-chloroethyl)]amino-5-chlorobenzamide in 5 ml. of anhydrous benzene. The mixture was then heated at reflux for 3 hours, cooled to room temperature and 10 ml. of benzene saturated with water carefully added. The benzene solution was then washed with water, and concentrated. The resulting solid was crystallized from benzene to yield 790 mg. of 7-chloro-1,2,3,4-tetrahydro-1-methyl-5H-1,4-benzodiazepin-5-one of melting point 183°–185° C.

Anal. calcd. for $C_{10}H_{11}ClN_2O$:

C, 57.01; H, 5.26; Cl, 16.83; N, 13.30.

Found:

C, 57.58; H, 5.34; Cl, 16.66; N, 12.97.

Preparation 6 7-Chloro-5-ethoxy-2,3-dihydro-1-methyl-1H-1,4-benzodiazepine

Epichlorohydrin (128 g.) was added, under nitrogen, to a stirred solution of freshly distilled boron trifluoride etherate (300 ml.) in ether (725 ml.) at such a rate that the reaction mixture refluxed gently. After the addition, the mixture was refluxed for an additional 1.5 hours and allowed to stand at ambient temperature for 18 hours. The solvent was then removed via a filter stick and the solid was washed several times with dry ether. Residual ether was removed in vacuo and the resulting solid was dissolved in dry methylene chloride (700 ml.) and added to an ice cold suspension of 7-chloro-1,2,3,4-tetrahydro-1-methyl-5H-1,4-benzodiazepin-5-one (145 g., 0.691 mole) in methylene chloride (2.8 l.). This mixture was allowed to stand at ambient temperature for 18 hours. It was then treated with 273 g. of 50 percent aqueous potassium carbonate. The yellow solution was filtered through a small pad of potassium carbonate and concentrated in vacuo. A suspension of the residue in water and ether was made alkaline with potassium carbonate. The layers were separated and the aqueous layer was extracted with ether. The combined ether solution was washed with brine, dried over anhydrous potassium carbonate and concentrated. A solution of the residue in petroleum ether was filtered through a small pad of silica gel and crystallized at 0° C. to give 102.8 g. (62.2 percent) of 7-chloro-5-ethoxy-2,3-dihydro-1-methyl-1H-1,4-benzodiazepine of melting point 36.5°–38.5° C. The analytical sample of melting point 38.5°–39° C. was prepared by recyrstallizing some of this material from petroleum ether at 0° C.

Anal. calcd. for $C_{12}H_{15}ClN_2O$:
C, 60.37; H, 6.33; Cl, 14.85; N, 11.74.
Found:
C, 60.53; H, 6.46; Cl, 15.08; N, 11.65.

The hydrochloride salt was prepared by acidifying an ethereal solution of the base with ethereal hydrogen chloride. The analytical sample of melting point 116.5° C. was prepared by recrystallizing the salt from methylene chloride-ethyl acetate.

Anal. calcd. for $C_{12}H_{16}Cl_2N_2O$:
C, 52.37; H, 5.86; Cl, 25.77; N, 10.18.
Found:
C, 52.24; H, 5.89; Cl, 26.15; N, 9.81.

In the same manner illustrated by Preparations 1–6 other 5-alkoxy-2,3-dihydro-1H-1,4-benzodiazepines (I) and acid addition salts thereof can be prepared. Representative starting materials, thus produced, include:

7-nitro-5-methoxy-2,3-dihydro-1,3-diethyl-1H-1,4-benzodiazepine;
9-cyano-2,3-dihydro-5-ethoxy-1-propyl-1H-1,4-benzodiazepine;
8-fluoro-2,3-dihydro-5-ethoxy-1-isopropyl-1H-1,4-benzodiazepine;
6-bromo-2,3-dihydro-1-methyl-5-propoxy-1H-1,4-benzodiazepine;
7-methylthio-2,3-dihydro-1,3-dipropyl-5-propoxy-1H-1,4-benzodiazepine;
7-trifluoromethyl-2,3-dihydro-1-methyl-5-ethoxy-1H-1,4-benzodiazepine;
9-nitro-2,3-dihydro-1-isopropyl-5-ethoxy-1H-1,4-benzodiazepine;
8-propylthio-2,3-dihydro-1-ethyl-3-isopropyl-5-methoxy-1H-1,4-benzodiazepine;
6-chloro-2,3-dihydro-1-methyl-5-methoxy-1H-1,4-benzodiazepine;
6-iodo-2,3-dihydro-1-ethyl-5-propoxy-1H-1,4-benzodiazepine;
9-bromo-2,3-dihydro-1-isopropyl-5-ethoxy-1H-1,4-benzodiazepine;
8-cyano-2,3-dihydro-1-ethyl-5-methoxy-1H-1,4-benzodiazepine;
8-nitro-2,3-dihydro-1-ethyl-5-ethoxy-1H-1,4-benzodiazepine;
9-isopropyl-2,3-dihydro-1-methyl-5-ethoxy-1H-1,4-benzodiazepine;
8-ethyl-2,3-dihydro-1-propyl-5-ethoxy-1H-1,4-benzodiazepine; and the like.

EXAMPLE 1

10-Chloro-6,7-dihydro-3,7-dimethyl-5H-1,2,4-triazolo[4,3-d][1,4]benzodiazepine

A mixture of 7-chloro-5-ethoxy-2,3-dihydro-1-methyl-1H-1,4-benzodiazepine (6.0 g.; 0.025 mole), acetyl hydrazide (2.75 g.) and absolute ethanol (25 ml.) was refluxed, under nitrogen, for 18 hours, cooled and poured into water. The solid product was collected by filtration, washed with water, dried and recrystallized from methanol-ethyl acetate to give 3.86 g. (62.4 percent) of 10-chloro-6,7-dihydro-3,7-dimethyl-5H-1,2,4-triazolo[4,3-d][1,4]benzodiazepine of melting point 182.5°–185.5° C. The analytical sample had a melting point of 185°–186.5° C.

Anal. calcd. for $C_{12}H_{13}ClN_4$:
C, 57.95; H, 5.27; Cl, 14.26; N, 22.53.
Found:
C, 57.77; H, 5.20; Cl, 14.34; N, 22.41.

EXAMPLE 2

10-Nitro-5,7-diethyl-6,7-dihydro-3-methyl-5H-1,2,4-triazolo[4,3-d][1,4]benzodiazepine In the manner given in Example 1, 7-nitro-5-methoxy-2,3-dihydro-1,3-diethyl-1H-1,4-benzodiazepine was heated in 1-propanol with acetyl hydrazide to give 10-nitro-5,7-diethyl-6,7-dihydro-3-methyl-5H-1,2,4-triazolo[4,3-d][1,4]-benzodiazepine.

EXAMPLE 3

8-Cyano-6,7-dihydro-3-ethyl-7-propyl-5H-1,2,4-triazolo[4,3-d][1,4]benzodiazepine In the manner given in Example 1, 9-cyano-2,3-dihydro-5-ethoxy-1-propyl-1H-1,4-benzodiazepine was heated in 2-propanol with propionyl hydrazide to give 8-cyano-6,7-dihydro-3-ethyl-7-propyl-5H-1,2,4-triazolo[4,3-d][1,4]benzodiazepine.

EXAMPLE 4

9-Fluoro-6,7-dihydro-7-isopropyl-3-propyl-5H-1,2,4-triazolo[4,3-d][1,4]benzodiazepine In the manner given in Example 1, 7-chloro-2,3-dihydro-1,3-dipropyl-5-propoxy-1H-1,4-benzodiazepine was heated in toluene was propionyl hydrazide to give 10-chloro-6,7-dihydro-5,7-dipropyl-3-ethyl-5H-1,2,4-triazolo-[4,3-d][1,4]benzodiazepine.

EXAMPLE 7

7-Methyl-6,7-dihydro-3-propyl-10-trifluoromethyl-5H-1,2,4-triazolo[4,3-d][1,4]benzodiazepine In the manner given in Example 1, 7-trifluoromethyl-2,3-dihydro-1-methyl-5-ethoxy-1H-1,4-benzodiazepine was heated in 2-butanol with butyryl hydrazide to give 7-methyl-6,7-dihydro-3-propyl-10-trifluoromethyl-5H-1,2,4-triazolo[4,3-d][1,4]benzodiazepine.

EXAMPLE 8

6,7-Dihydro-7-ethyl-5-isopropyl-3-methyl-9-propylthio-5H-1,2,4-triazolo[4,3-d][1,4]benzodiazepine In the manner given in Example 1, 2,3-dihydro-1-ethyl-3-isopropyl-5-methoxy-8-propylthio-1H-1,4-benzodiazepine was heated in ethanol with acetyl hydrazide to give 6,7-dihydro-7-ethyl-5-isopropyl-3-methyl-9-propylthio-5H-1,2,4-triazolo[4,3-d][1,4]benzodiazepine.

EXAMPLE 9

6,7-Dihydro-3-ethyl-11-iodo-7-methyl-5H-1,2,4-triazolo[4,3-d][1,4]benzodiazepine In the manner given in Example 1, 2,3-dihydro-6-iodo-1-methyl-5-propoxy-1H-1,4-benzodiazepine was heated in benzene with propionyl hydrazide to give 6,7-dihydro-3-ethyl-11-iodo-7-methyl-5H-1,2,4-triazolo[4,3-d][1,4]-benzodiazepine.

EXAMPLE 10

8-Cyano-6,7-dihydro-7-ethyl-3-methyl-5H-1,2,4-triazolo[4,3-d][1,4]benzodiazepine In the manner given in Example 1, 9-cyano-2,3-dihydro-1-ethyl-5-methoxy-1H-1,4-benzodiazepine was heated in ethanol with acetylhydrazide to give 8-cyano-6,7-dihydro-7-ethyl-3-methyl-5H-1,2,4-triazolo[4,3-d][1,4]benzodiazepine.

In the same manner given in Example 1, other 6,7-dihydro-7-alkyl-3-substituted or unsubstituted -5H-1,2,4-triazolo[4,3-d][1,4]benzodiazepine (II) can be produced by reacting a 5-alkoxy-2,3-dihydro-1-alkyl-1H-1,4-benzodiazepine (I) with an alkanoyl hydrazide III. Representative compounds thus obtained include:

8-methylthio-6,7-dihydro-7-isopropyl-3-ethyl-5H-1,2,4-triazolo[4,3-d][1,4]benzodiazepine;

11-iodo-6,7-dihydro-3,7-dimethyl-5H-1,2,4-triazolo[4,3-d]-[1,4]benzodiazepine;

8-bromo-6,7-dihydro-7-isopropyl-3-ethyl-5H-1,2,4-triazolo-[4,3-d][1,4]benzodiazepine;

9-nitro-6,7-dihydro-7-ethyl-3-propyl-5H-1,2,4-triazolo-[4,3-d][1,4]benzodiazepine;

8-isopropyl-6,7-dihydro-3,7-dimethyl-5H-1,2,4-triazolo-[4,3-d][1,4]benzodiazepine;

9-ethyl-6,7-dihydro-7-propyl-3-methyl-5H-1,2,4-triazolo-[4,3-d][1,4]benzodiazepine;

6,7-dihydro-7,11-dimethyl-3-propyl-5H-1,2,4-triazolo-[4,3-][1,4]benzodiazepine;

10-propyl-6,7-dihydro-7-ethyl-3-methyl-5H-1,2,4-triazolo-[4,3-d][1,4]benzodiazepine;

10-fluoro-6,7-dihydro-7-isopropyl-5H-1,2,4-triazolo[4,3-d]-[1,4]benzodiazepine;

and the like.

Treating the compounds of formula II with pharmacologically acceptable acids such as hydrochloric, hydrobromic, phosphoric, sulfuric, acetic, propionic, toluenesulfonic, methanesulfonic, tartaric, citric, lactic, malic, maleic, cyclohexanesulfamic acids produces the pharmacologically acceptable salts of these compounds of formula II. Salt formation is achieved in conventional manner by reacting the compounds of formula II with an excess of a selected acid in a suitable medium e.g., water, lower alkanol, ether, or acetone and recovering the salt by evaporating the solvent, preferably in vacuo.

I claim:
1. A compound selected from the group consisting of 6,7-dihydro-7-alkyl-5H-1,2,4-triazolo[4,3-d][1,4]benzodiazepines of the formula

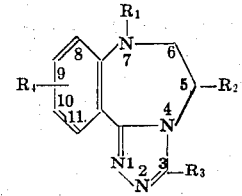

wherein $R_1$ is of one to three carbon atoms, inclusive; wherein $R_2$ and $R_3$ are selected from the group consisting of hydrogen and alkyl defined as above; and wherein $R_4$ is selected from the group consisting of hydrogen, alkyl as defined above, nitro, cyano, fluoro, chloro, bromo, iodo, trifluoromethyl, and alkylthio in which alkyl is defined as above, and the pharmacologically acceptable acid addition salts thereof.

2. A compound according to claim 1 wherein $R_1$ and $R_3$ are methyl, $R_2$ is hydrogen, $R_4$ is 10-chloro, and the compound is therefore 10-chloro-6,7-dihydro-3,7-dimethyl-5H-1,2,4-triazolo[4,3-d][1,4]benzodiazepine.

3. A compound according to claim 1, wherein $R_1$ and $R_2$ are ethyl, $R_3$ is methyl, $R_4$ is 10-nitro and the compound is therefore 10-nitro-5,7-diethyl-6,7-dihydro-3-methyl-5H-1,2,4-triazolo[4,3-d][1,4]benzodiazepine.

4. A process for the production of a 6,7-dihydro-7-alkyl-5H-1,2,4-triazolo[4,3-d][1,4]benzodiazepine of the formula II

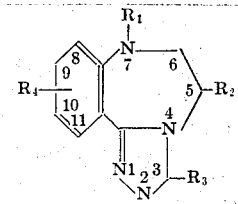

II wherein $R_1$ is alkyl of one to three carbon atoms, inclusive; wherein $R_2$ and $R_3$ are selected from the group consisting of hydrogen and alkyl defined as above; and wherein $R_4$ is selected from the group consisting of hydrogen, alkyl as defined above, nitro, cyano, fluoro, chloro, bromo, iodo, trifluoromethyl, and alkylthio in which alkyl is defined as above; which comprises: heating between 60° to 120° C. a 5-alkoxy-2,3-dihydro-1-alkyl-1H-1,4-benzodiazepine I

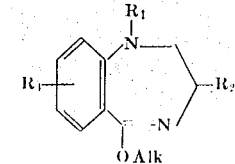

I wherein $R_1$, $R_2$, and $R_4$ are defined as above and Alk is alkyl defined as above with an alkanoyl hydrazide III

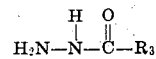

III wherein $R_3$ is defined as above, in an organic solvent to obtain the compound of formula II above.

5. The process of claim 4 wherein the organic solvent is ethanol.

* * * * *